Figure 1:
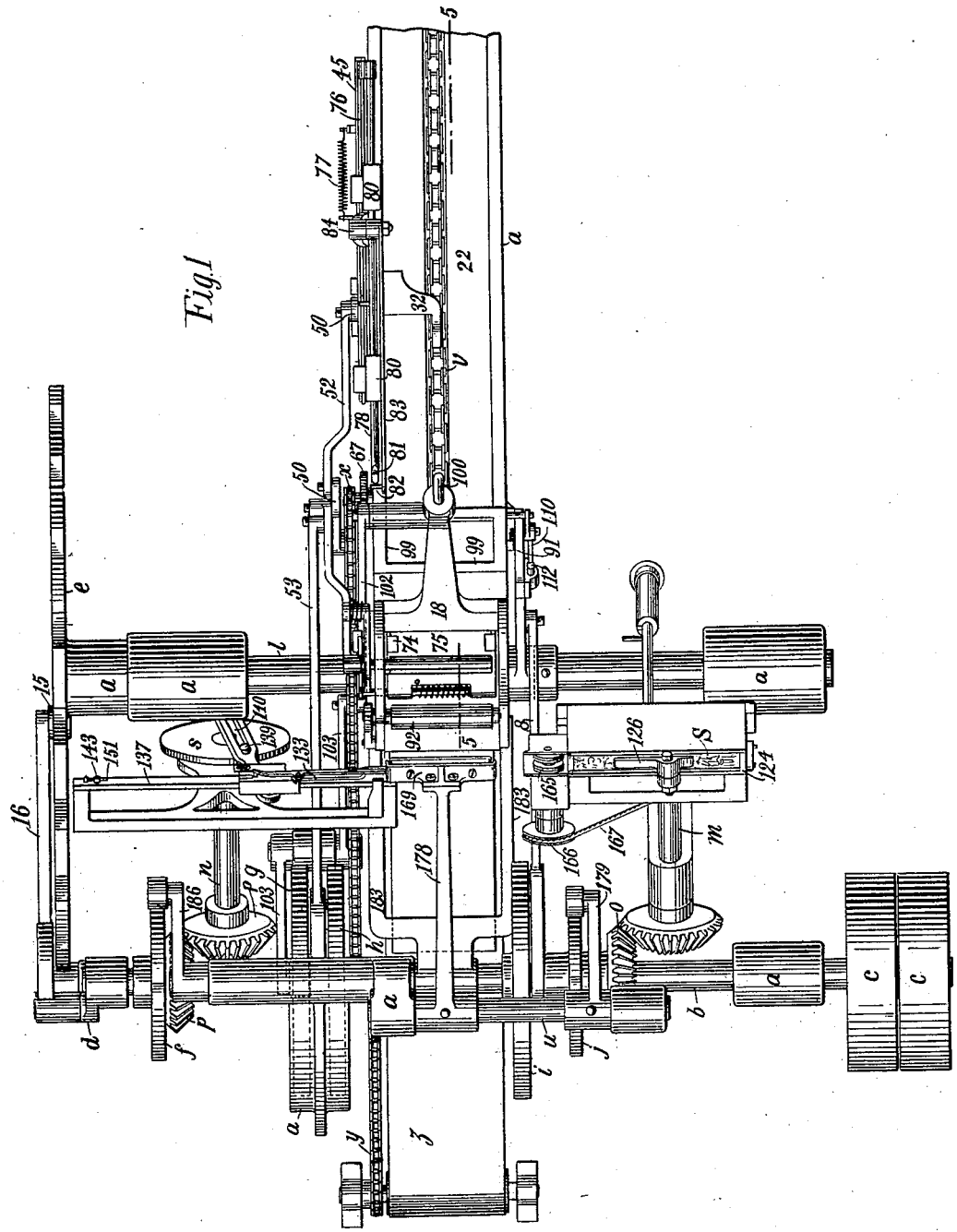

No. 683,651. Patented Oct. 1, 1901.
W. R. LANDFEAR & J. A. KEYES.
MACHINE FOR APPLYING LABELS AND STAMPS TO PACKAGES.
(Application filed Dec. 31, 1900.)
(No Model.) 9 Sheets—Sheet 1.

Witnesses:
Raphael Netter
C.D. Morrill

Inventors:
William R. Landfear
James A. Keyes.
by Robert H. Duncan. Atty.

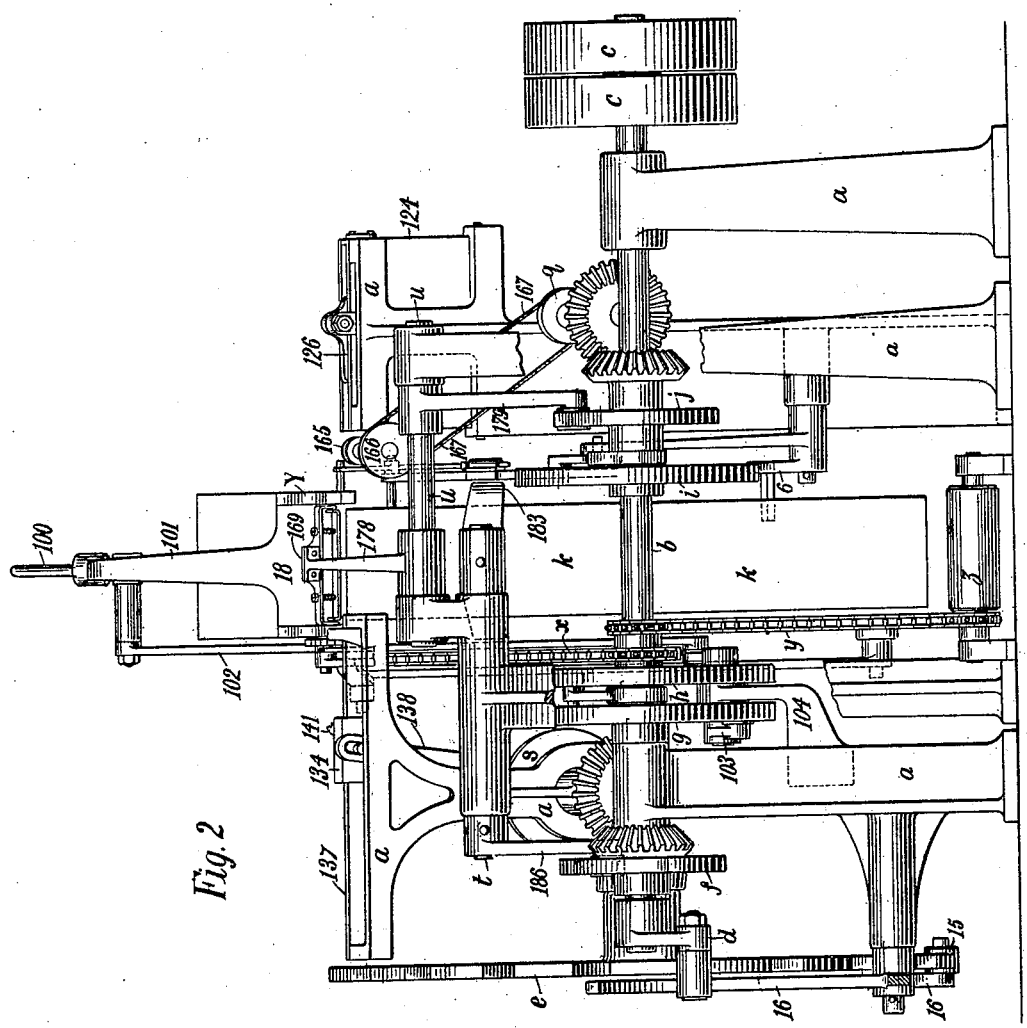

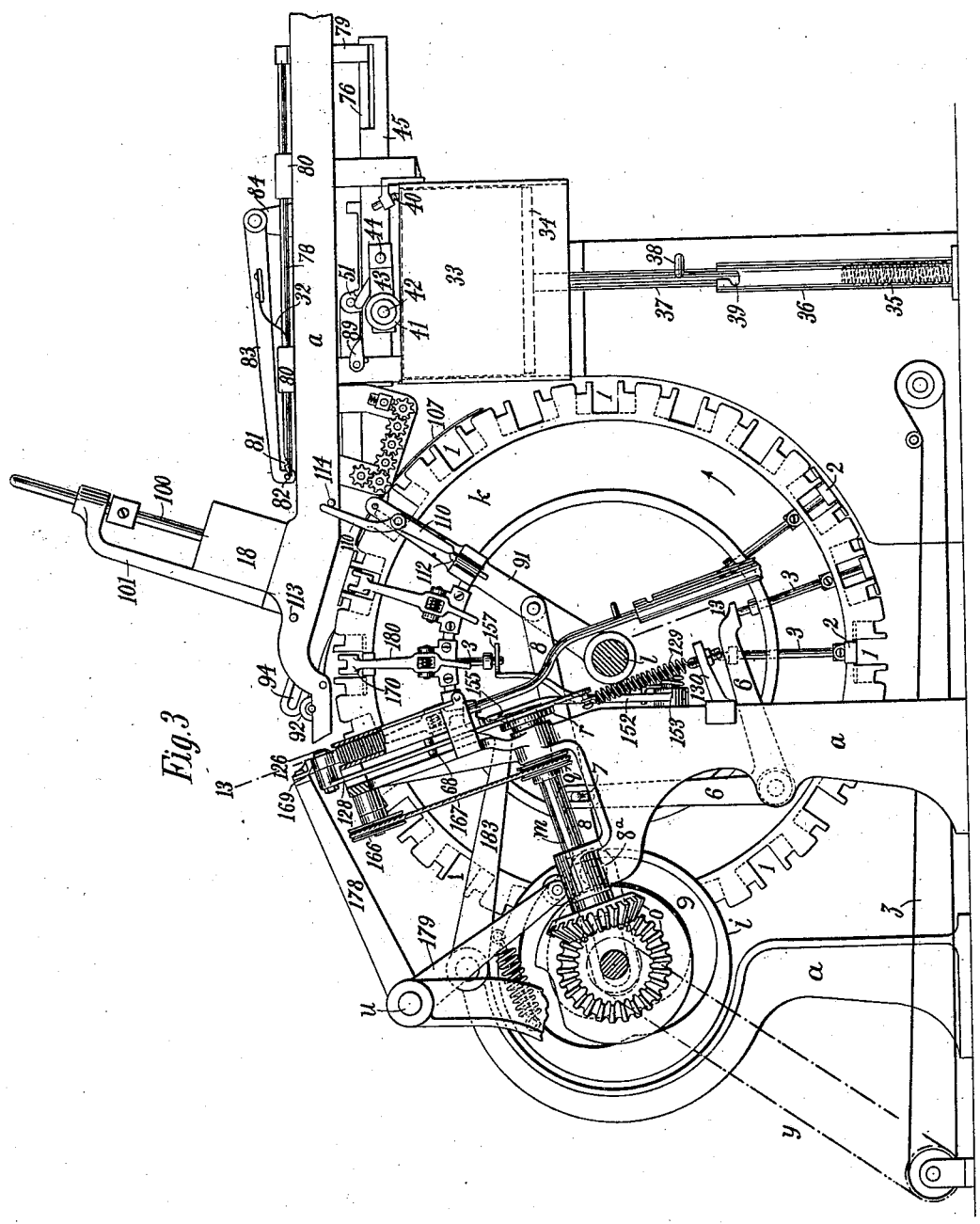

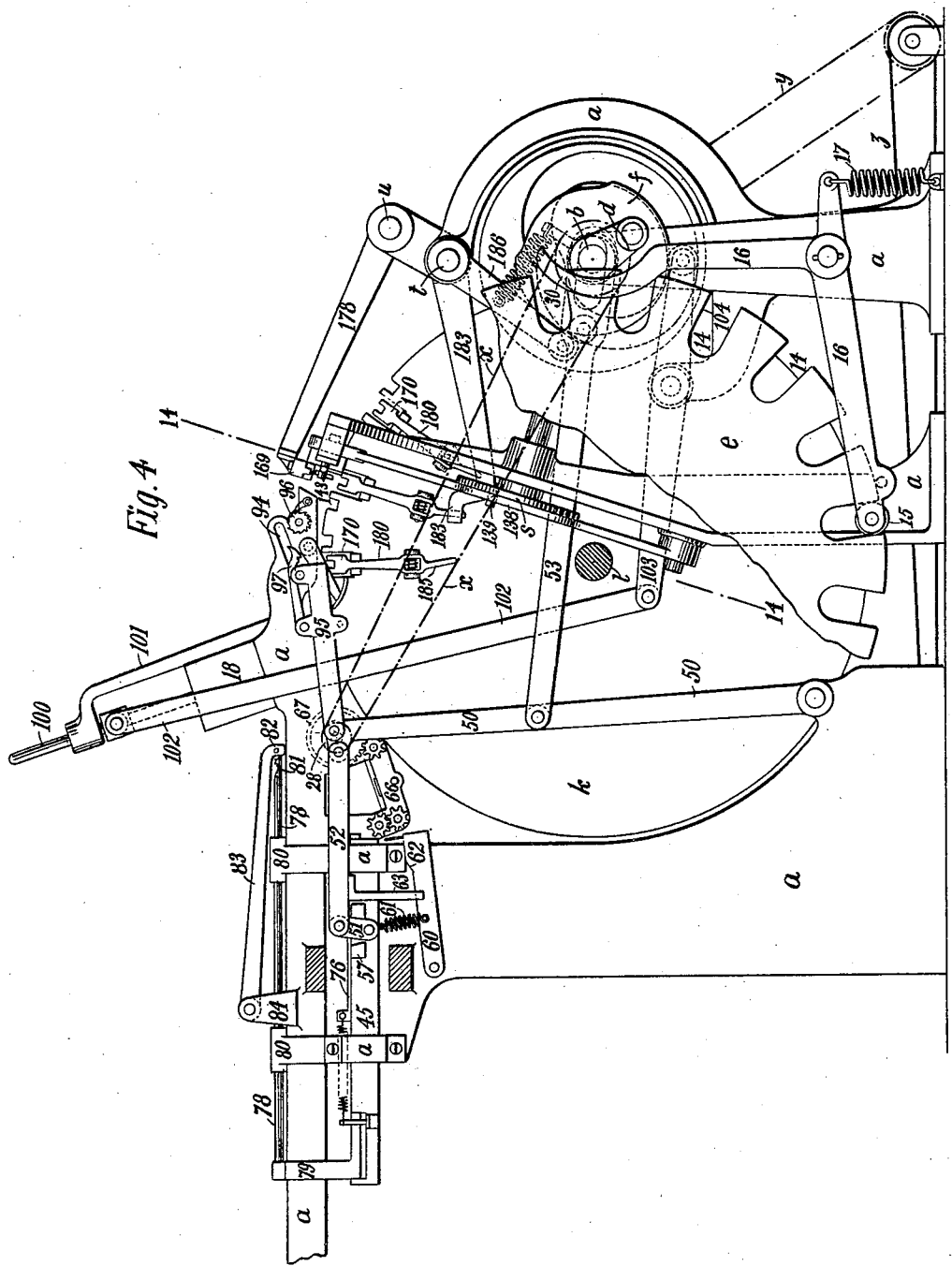

No. 683,651. Patented Oct. 1, 1901.
W. R. LANDFEAR & J. A. KEYES.
MACHINE FOR APPLYING LABELS AND STAMPS TO PACKAGES.
(Application filed Dec. 31, 1900.)
(No Model.) 9 Sheets—Sheet 5.
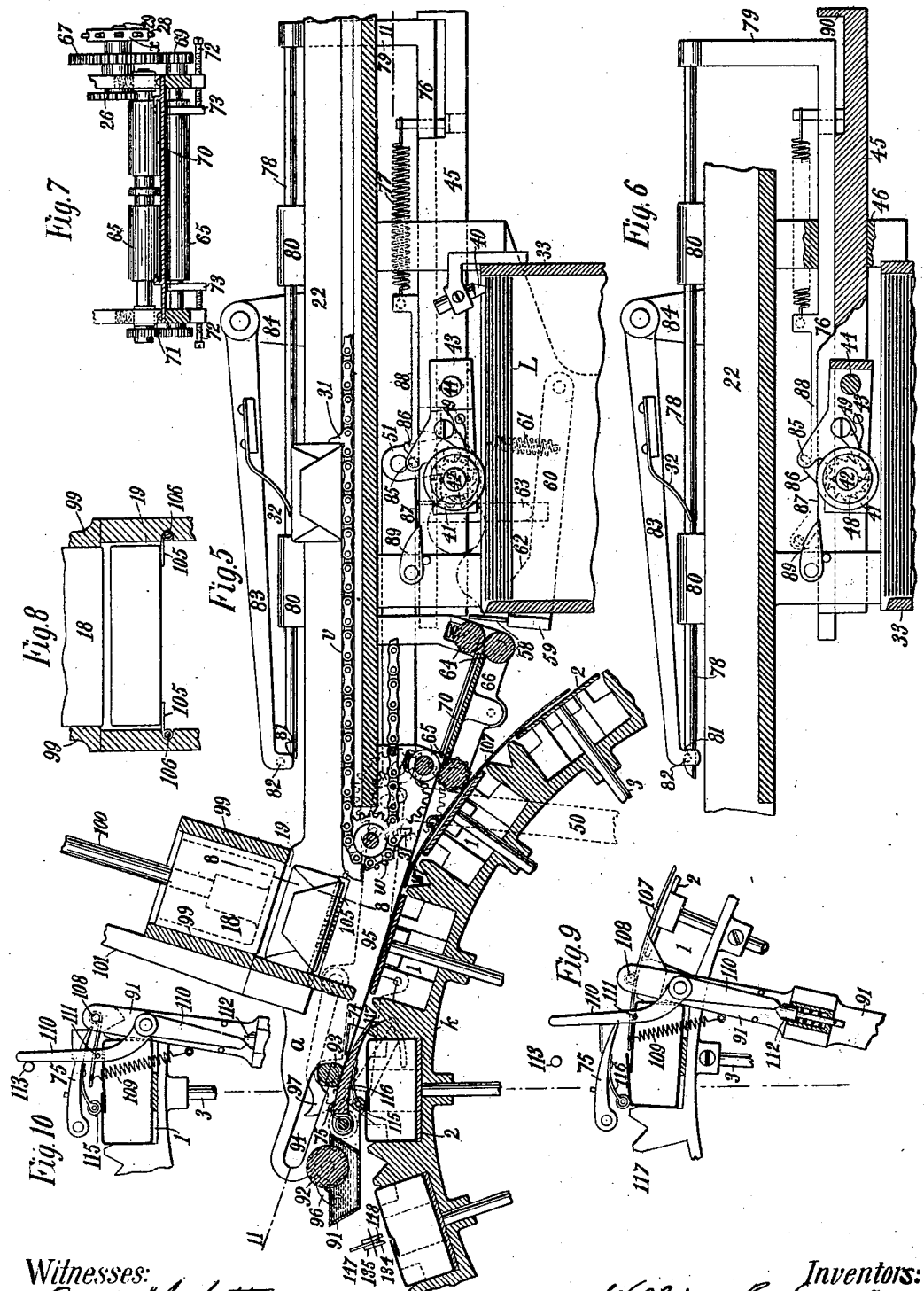
Witnesses:
Raphael Netter
C. D. Morrill
Inventors:
William R. Landfear
James A. Keyes
by Robert H. Duncan Atty No. 683,651. Patented Oct. 1, 1901.
W. R. LANDFEAR & J. A. KEYES.
MACHINE FOR APPLYING LABELS AND STAMPS TO PACKAGES.
(Application filed Dec. 31, 1900.)
(No Model.) 9 Sheets—Sheet 6.
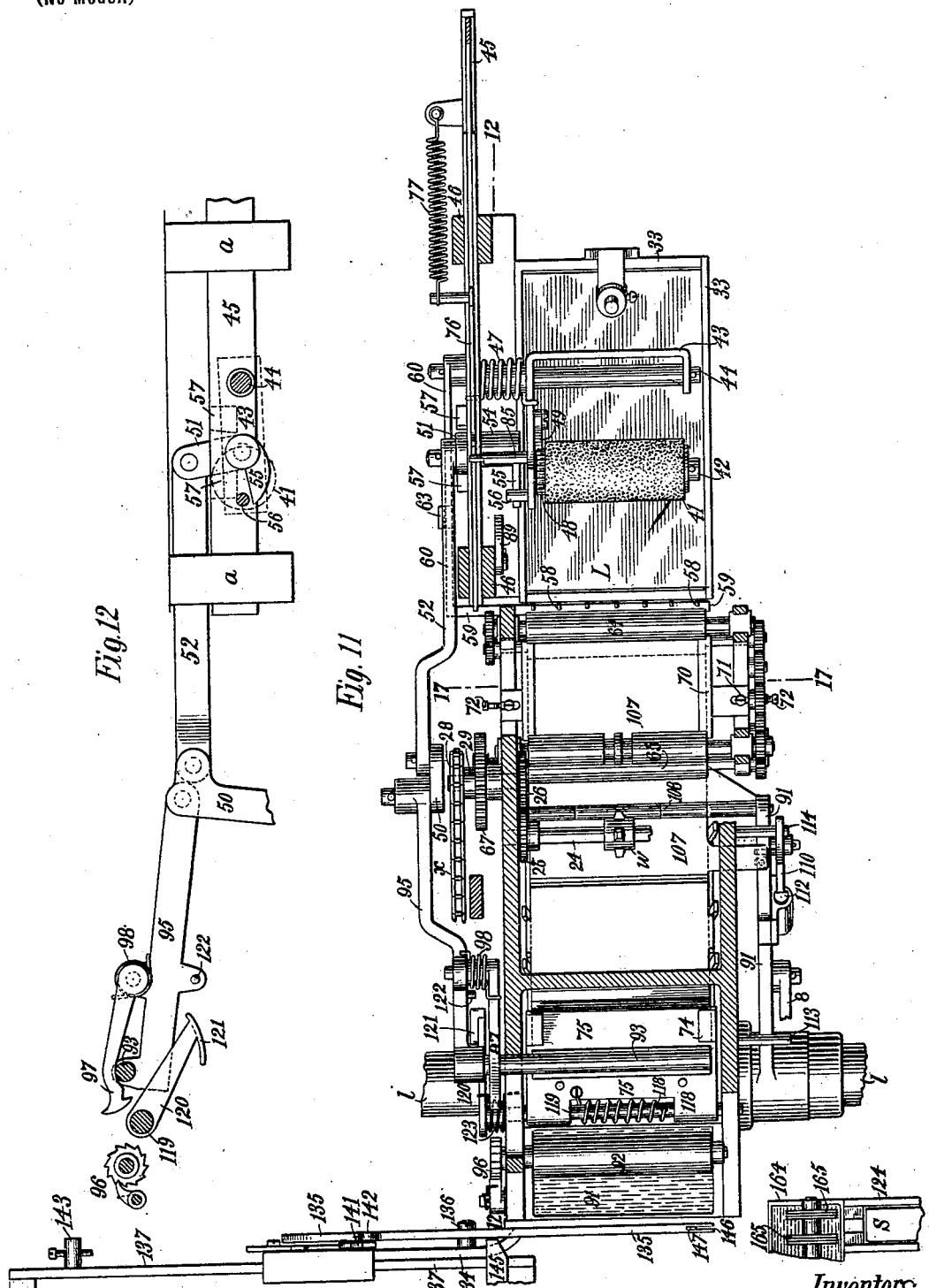
Witnesses:
Raphael Netter
C. D. Morrill
Inventors:
William R. Landfear
James A. Keyes
by Robert H. Duncan — Atty
THE NORRIS PETERS CO., PHOTO-LITHO., WASHINGTON, D. C.

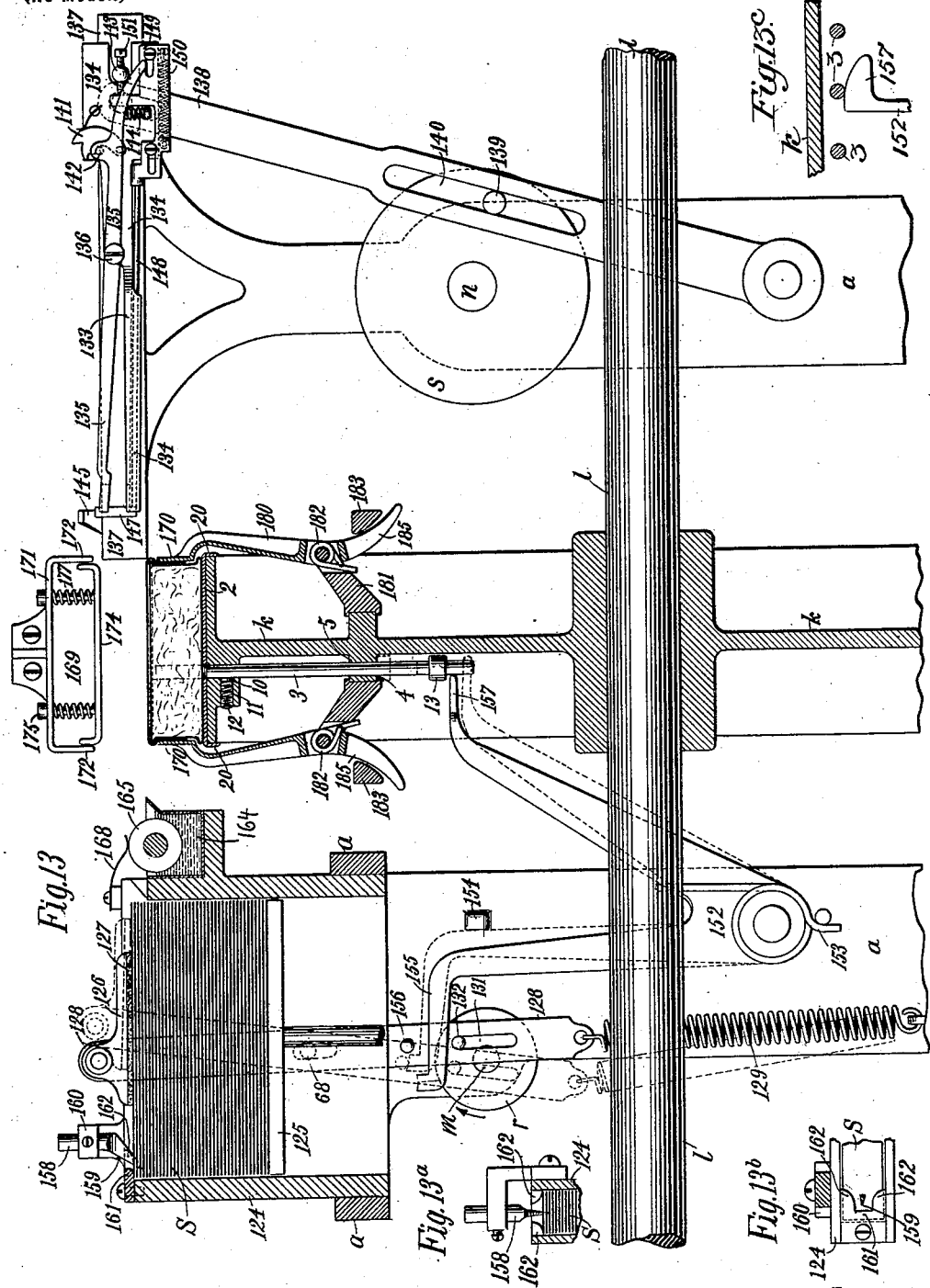

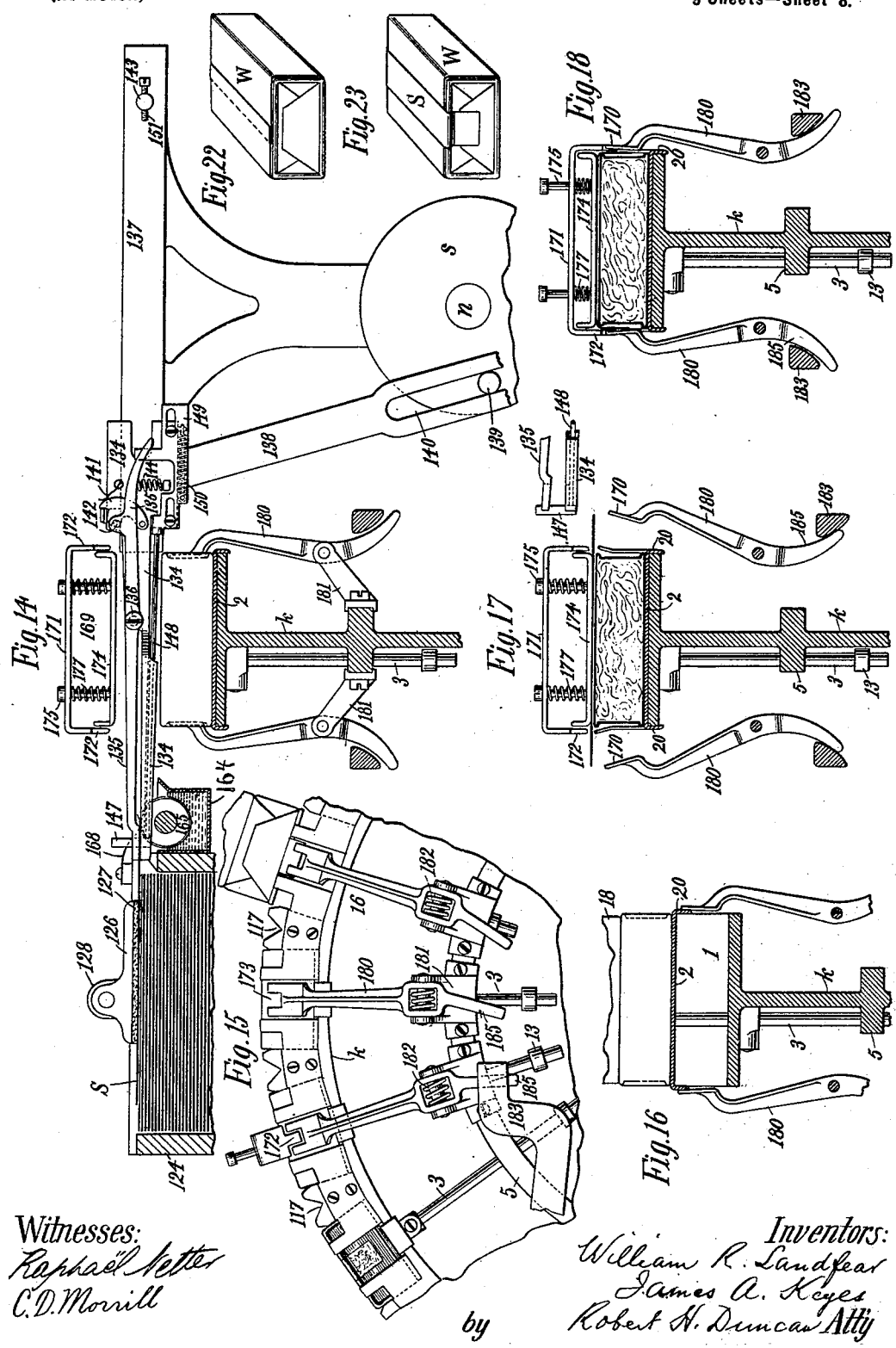

No. 683,651. Patented Oct. 1, 1901.
W. R. LANDFEAR & J. A. KEYES.
MACHINE FOR APPLYING LABELS AND STAMPS TO PACKAGES.
(Application filed Dec. 31, 1900.)
(No Model.) 9 Sheets—Sheet 9.
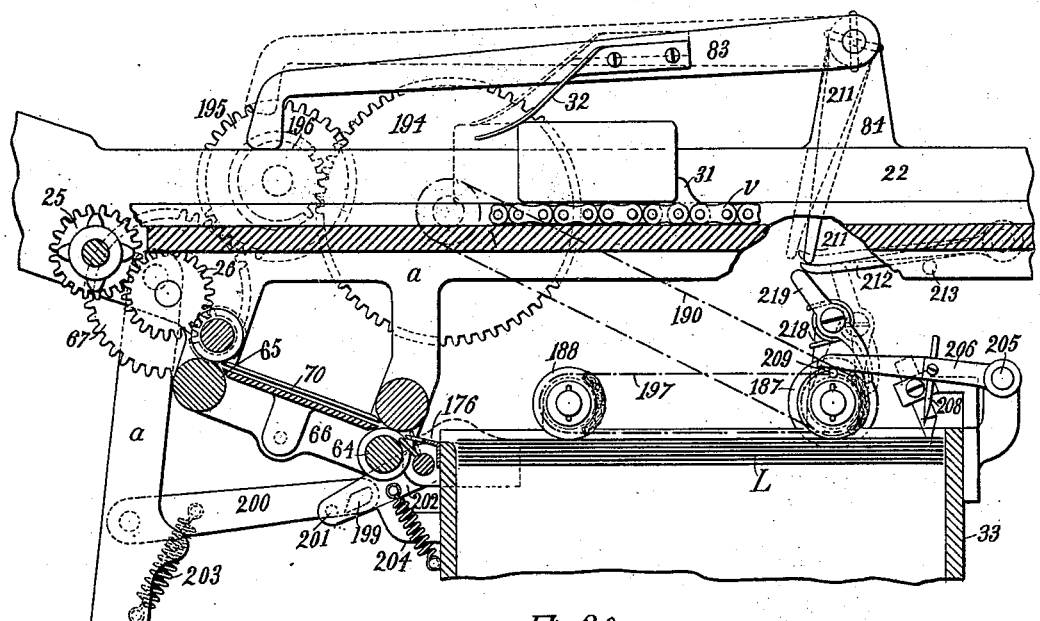
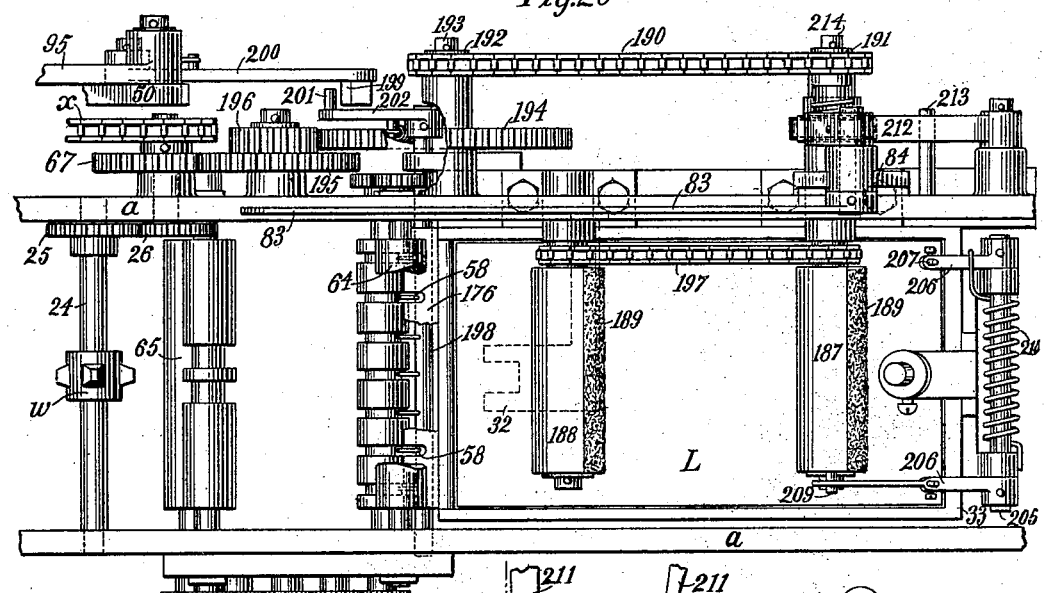

UNITED STATES PATENT OFFICE.

WILLIAM R. LANDFEAR AND JAMES A. KEYES, OF NEW YORK, N. Y.,
ASSIGNORS TO RICHARD H. WRIGHT, OF SAME PLACE.

MACHINE FOR APPLYING LABELS AND STAMPS TO PACKAGES.

SPECIFICATION forming part of Letters Patent No. 683,651, dated October 1, 1901.

Application filed December 31, 1900. Serial No. 41,668. (No model.)

*To all whom it may concern:*

Be it known that we, WILLIAM R. LAND-FEAR and JAMES A. KEYES, citizens of the United States, residing in the city of New York, in the State of New York, (the post-office address of the former being No. 258 Madison street, Brooklyn, New York, and that of the latter being No. 550 East One Hundred and Sixty-third street, New York city, New York,) have jointly invented new and useful Improvements in Machines for Applying Labels and Stamps to Packages, of which the following is a specification.

The present invention relates to machines for applying labels and stamps to packages of tobacco or other material which is usually inclosed in paper wrappers.

A machine embodying all the improvements of the present invention will comprise mechanisms or devices for feeding the packages to a label-applying position; feeding the labels, applying paste to one end thereof, and folding them around and securing them to the packages; feeding the stamps to the packages, applying paste thereto, and folding them over and securing them to the packages; expelling the packages from the molds and removing them from the machine; also mechanisms or devices for preventing the feed of a label or stamp to its applying position when no package will be in position to receive such label or stamp.

The invention consists, stated generally, in the novel construction of the various mechanisms and devices and in their combinations and subcombinations with each other and with other parts of the machine, as hereinafter more fully described, shown in the drawings, and specified in the claims.

The accompanying drawings (nine sheets) illustrate a form of machine embodying the present improvements, and for the purpose of clearness various parts of the machine are shown as detached from their contiguous parts.

In the drawings, Figure 1 is a plan or top view of the machine, the package-trough and feed-chain being shown as broken off at the right hand of the figure. Fig. 2 is an end elevation as seen from the left hand of Fig. 1. Fig. 3 is a side elevation as seen from the side of the observer of Fig. 1, the driving-pulleys and some other parts being omitted for clearness. Fig. 4 is a side elevation as seen from the side opposite to the observer of Fig. 1, the star-wheel being broken away to show the parts beyond and some parts being in section. Fig. 5 is an enlarged longitudinal sectional view along the line 5 5 of Fig. 1, showing the package and label-feeding mechanisms, the label, paste-applying and folding devices, and a segment of the mold-wheel. Fig. 6 is a sectional view of a part of the label-feeding mechanism similar to that shown in Fig. 5, except that some of the parts are in different positions. Fig. 7 is a transverse section on the line 17 17 of Fig. 11, showing label-feed rollers and guide. Fig. 8 is a transverse section on line 8 8 of Fig. 5, showing plunger and package-receiver with spring-bottom. Figs. 9 and 10 are detail views of devices in different positions for folding the labels around the packages. Fig. 11 is an enlarged horizontal section on the line 11 11 of Fig. 5, certain parts being omitted. Fig. 12 is an enlarged vertical section on the line 12 12 of Fig. 11, certain parts being omitted. Fig. 13 is a transverse section on the line 13 13 of Fig. 3 and 14 14 of Fig. 4, showing the stamp-box, stamp feeding and pasting devices, and mold-wheel. Figs. 13$^a$ and 13$^b$ are detail plan and cross-sectional views of stamp and label retaining devices. Fig. 13$^c$ is a detail view showing the relation of the rods 3, attached to the mold-bottom, with the end of lever 152 connected to the stamp starting and feeding device. Fig. 14 is a similar view to that of Fig. 13, showing the stamp-feeding mechanism in a different position. Fig. 15 is a side elevation of a sector of the mold-wheel. Fig. 16 is a transverse section on the line 16 16 of Fig. 15. Figs. 17 and 18 are detail sectional views of the mold-wheel and package, showing devices for applying the stamp to the package. Fig. 19 is a longitudinal section of a modification of label-feeding devices. Fig. 20 is a plan view of the same, the feeding-chain and bottom of package-conveying channel being omitted. Fig. 21 is a detail view of a pawl-and-ratchet construction and contiguous parts, and Figs. 22 and 23 are detail views of packages to which a label and stamp have been applied.

To aid in more readily understanding the general location of the operative parts of the machine, it is here stated, reference being made especially to Figs. 1, 2, 5, and 14 of the drawings, that the packages to which labels and stamps are to be applied are fed along a trough or channel located near the top of the machine by an endless belt or chain running therein and are thereby delivered into a stationary receiver located near the center of the length and width of the machine and over the top of a mold-wheel. A box containing a pile of labels is located beneath the package-feeding trough, and the labels, one at a time, are started from the top of the pile and are fed forward in the same direction as the packages by mechanism located at one side of and beneath the trough till the middle part of a label is brought to a stop below the package-receiver and over a mold in the wheel, when its forward end is supplied with paste by contiguously-located devices, and then a plunger descends upon the top of the package in the receiver and forces it and the middle part of the label into the underlying mold in the wheel, which immediately begins to move forward, and during such forward movement rear and front folders operate upon the opposite ends of the label to fold them over upon the body of the package and secure them in an overlapped pasted seam. When the package has reached its second stopping-place from where it was placed in the mold, it receives its stamp, which is fed from a box, located on one side of the mold-wheel, by devices arranged on each side of the wheel transversely to the path of the wheel and slightly above it and is stopped directly over the package with its ends overreaching the ends of the package. As the stamp is fed into place it is supplied with paste upon its under side and its middle part is pressed down upon and secured lengthwise to the body of the package, while its ends are folded against the opposite ends of the package and secured thereto. The packages remain in their respective molds in the wheel till the molds have reached about their lowest point of rotation, when they are expelled upon an endless moving belt and carried to any desired point outside of the machine. Several of these operations are carried on simultaneously.

In the drawings, $a$ represents the frame or standards of the machine, on which are mounted the operative devices and mechanisms and the means for actuating them, among which are the main driving-shaft $b$, carrying on one of its ends the pulleys $c$ and on its opposite end a crank $d$ for rotating a star-wheel $e$ and also carrying cam-wheels $f$, $g$, $h$, $i$, and $j$, which operate through suitable connections therewith certain of the feeding, folding, and other devices, as especially shown in Fig. 2. The star-wheel $e$ is connected to and rotates a mold-wheel $k$ through their common shaft $l$, as especially seen in Fig. 1. Two inclined counter-shafts $m$ and $n$, driven from shaft $b$ through sets of beveled gear-wheels $o$ and $p$, carry one a driving-pulley $q$ and disk $r$ and the other a disk $s$, as shown in Figs. 1 and 2. Two rock-shafts $t$ and $u$ are connected to and operated from the main shaft $b$, and a package-feeding belt or chain $v$ passes over a sprocket-wheel $w$, which is driven from shaft $b$ through connecting-chain $x$ and gear-wheels, while chain $y$ drives one roller of the discharging-belt $z$.

The following is a detailed description of the machine.

*The mold-wheel.* (See Figs. 2, 3, 4, 11, 13, 14, 15, 16, and 17.)—The mold-wheel $k$, which forms an important feature of the machine, rotates with its shaft $l$ in the direction of the movement of the upper branch of the package-feeding chain $n$ and occupies a central position. The periphery of the wheel is provided with a series of open-topped and partially-open-ended molds 1, arranged at uniform distances apart and extending around the wheel. Each mold is provided with a vertically-movable bottom 2, which is attached to an inwardly-projecting guide-rod 3, passing through a guide-hole 4 in an arm 5, attached to the web of the wheel, and this bottom is carried toward the top of the mold in order to expel a package by forcing its rod in that direction by the movement of the free end of the bell-crank lever 6, pivoted to a standard and loosely attached by a pin-and-slot connection 7 to lever 8, which is yoked over the driving-shaft $b$ and is operated by a roller $8^a$, attached to the lever and running in cam-groove 9 in right-hand face of wheel $i$, as seen in Figs. 1, 2, and 3. The movable bottom 2 is held in its outward position (which is its normal position) by the frictional contact of a buffer 10, held against its rod 3 by a spring 11, which is retained in a hole in a boss on the under side of the mold by a screw 12, and the outward movement of the rod 3 is limited by a boss 13 striking against the arm 5. The movable bottom is provided with end edge flanges 20 for the purposes hereinafter described. The mold-wheel is rotated intermittently by its connection, through the common shaft $l$, with the star-wheel $e$, which in turn is intermittently rotated by the crank $d$ on end of main shaft $b$ operating in the recesses 14 on the periphery of the wheel and is held stationary after each brief rotation by a roller 15 entering one of the recesses, the roller being mounted on the end of one arm of a rock-lever 16, pivoted to a standard, while its other bent end is operated by the crank to carry the roller 15 out of its recess just as the wheel begins its rotation, the roller being carried into the next recess of the series as soon as the movement of the crank permits by the contraction of a spring 17, attached to a projection of the lever 16 at its pivotal point and to the frame, as seen in Figs. 1, 2, and 4. The mold-wheel being secured to the same shaft as the star-wheel partakes of the intermittent movement of the latter, and the wheels are so adjusted on their common shaft that when stationary one of the molds will be directly in line with the downward movement of plunger 18, which forces the package from its receiver 19 into the mold, as seen in Fig. 11.

*Package and label feeding mechanisms.* (See Figs. 1, 2, 3, 4, 5, 6, 7, 11, 12, 19, 20, 21, and 22.)—The packages are placed upon an endless moving chain or belt $v$, which runs through a stationary trough or channel 22, secured to the frame of the machine, and is driven by a sprocket-wheel $w$ on shaft 24, the shaft being rotated by its connection with the main shaft $b$ through gear-wheels 25 and 26 and chain $x$, which passes over sprocket-wheel 28 on shaft 29 and over sprocket-wheel 30 on main shaft. The chain $v$ is provided with a series of projections or package-stops 31, arranged at uniform distances apart throughout its length, with which the rear edges of the packages are brought into contact by a downwardly-projecting arm 32 and are carried by the advance of the chain into the package-receiver 19. The distance apart of the stops 31 and the speed of the chain are in such relation to the rotation of the mold-wheel and the distance apart of the molds thereon that a package is delivered to the receiver as often as a mold is brought to a stop thereunder to receive the package, the construction and operation being best shown in Fig. 5.

Labels L of the proper size and bearing the desired inscriptions are placed in a pile in a box 33, secured to the frame, and are supported therein upon a vertically-movable platform 34, which is forced upward by an expansion-spring 35 in a case 36, into which the lower end of platform-carrying rod 37 enters and rests upon the top of the spring, the rod being preferably provided with a pin 38 and the case with a notch 39, by which the platform can be readily pulled down and locked while the box receives a fresh supply of labels, which may be introduced at the top of the box or at any convenient opening in its sides. The supporting-platform under the expansion of its spring constantly forces the labels upward against a fixed retaining-blade 40, located near the rear of the box and having its rear part sharpened to a cutting edge and its lower end sufficiently pointed to pierce two or more labels and hold the under ones in place while the top one is started from the pile and fed therefrom, the blade cutting a short slit in each top label as it is moved forward. This construction is illustrated in Figs. 3 and 5.

The devices for feeding the labels from the box 33 to a position under the receiver 19 and providing that when by accident or otherwise no package is being fed to the receiver no label will be separated from the pile and fed to position over the mold are shown in Figs. 1, 3, 4, 5, 6, 7, 11, and 12 and described as follows: A roughened reciprocating surface arranged to be pressed down upon the top label of the pile during its forward movement operates to detach the label from the retaining-blade and feed it forward till it can be grasped by other feeding devices. As shown in Figs. 5, 6, and 11 of the drawings, this starting device is in the form of a roller 41, overhanging the label-box, and is carried on a stud 42, fixed to a frame 43, which is loosely secured to a pin or stud 44, which is fixed to and moved with a main slide 45, arranged to reciprocate in ways 46, fixed to the frame of the machine. The frame 43 is arranged to rock up and down on its fixed stud 44 as a center and is held in its normal position to press the roller 41 upon the top label by a spring 47, secured to the slide and the frame 43, and is rocked upward to lift the roller on its backward movement out of contact with the label by means hereinafter described. The roller 41 is held from rotation by a ratchet 48, fixed to the roller, and pawl 49, fixed to the frame 43, so that the roller is simply pushed or drawn along in contact with the label to advance the latter, but can be rotated on its stud by hand in order to present a fresh line or part of its surface to the labels whenever desired.

The main slide 45, to which frame 43, carrying roller 41, is attached, as described, and shown in Figs. 11 and 12, is reciprocated by its attachment to lever 50 through a link 51, pivoted at its upper end to bar 52, which is pivoted to top of lever 50 and pivoted at its lower end to slide 45. The lever 50 is pivoted at its lower end to the frame of the machine, and the desired throw is given to the upper end through its connection with lever 53, which is pivoted at one of its ends to lever 50, while its opposite end is yoked over to main shaft $b$ and is actuated by a roller attached to the lever and working in cam-groove in the left-hand face of wheel $h$, as seen in Figs. 1, 2, and 4. The lower pivot of link 51 passes through and projects considerably beyond slide 45, and the projecting part is provided with a fixed sleeve 54, which carries a radial projection 55, whose upward rocking movement will bring it in contact with an overhanging pin 56, fixed to the frame 43. On the opposite side of the slide 45 and attached thereto are two abutments 57, located one on either side of and in the same plane with the link 51 and having properly-inclined edges contiguous to the edges of the link, whose object is to limit the backward and forward throw of the link whenever the movement of the slide is reversed. The position of the parts when the slide is moving forward is shown in Fig. 12, where the link is in contact with the forward abutment; but when the movement is reversed and before the slide begins to move backward perceptibly the link will be rocked upon its lower pivot until its rear edge contacts with the rear abutment, and the projection 55 will strike against and raise the pin 56 and cause frame 43 to be rocked on its pin 44 against the stress of spring 47 to raise the forward end of the frame and to lift the starting-roller 41, attached thereto, out of feeding contact with the top label and retain it in this position during the backward movement of the slide, and as the parts are adjusted for the forward movement the rocking of the link will lower the projection 55 and permit the spring 47 to force the frame downward to its normal position, in which the starting-roller is in feeding contact with the top label.

A row of pins or upward projections 58 are fixed to a bar 59, which extends in front of the label-box and is attached to a bar 60, which is pivoted to the frame of the machine, the two forming a frame which is controlled by a spring 61, so that in its normal position the projections 58 will be raised above the top label and will be held in that position till the end of the label as it is started forward comes in contact with the projections, as seen in Fig. 5, and then they are lowered to permit the label to be advanced by the contact of the incline 62 on arm 60 with a downwardly-projecting bar 63, fixed to connecting-bar 52. These projections provide a gage or evener to correct any variations in the positions of the ends of the labels in the pile and so that the labels will be delivered to subsequent feeding devices and reach the limit of their feed at uniform intervals of time.

When the evener is used, the forward end of the top label will be buckled up between the evener and the roller 41, as seen in Fig. 5, and as soon as the evener is lowered this end of the label will spring forward and be seized by other feeding devices. As shown in Figs. 5, 7, and 11, such devices consist of two pairs of feed-rollers 64 and 65, journaled in a frame 66, suspended from the frame of the machine, and driven by the mesh of gear-wheel 67 on driven shaft 29 with a gear-wheel 69 on the lower roller of the forward pair 65, while the upper roller is driven by intermeshing gears on the ends of the rollers opposite gear 69, and the rear pair of rollers 64 are driven by intermediate gears connecting the lower roller of the forward pair with a gear-wheel on the end of the lower roller of the rear pair, the upper roller of the rear pair being driven by intermeshing gears attached to the ends of the rollers, as seen in Figs. 3, 4, 5, 7, and 11. Between the two pairs of rollers is an adjustable label-guide 70, secured to the frame by screws 71, working in slots in the guide, and the guide is adjusted laterally by screws 72, threaded through the frame and taking against projections 73, fixed to the guide. The rear pair of rollers 64 are so located relatively to the evener that as the latter is lowered the forward end of the top label, by reason of its buckle, will spring forward and be caught in the bite of the rollers and be fed through the guide 70 into the bite of the forward pair of rollers 65, and thence onward through guide 74, attached to a rocking apron 75, where it receives a line of paste by devices hereinafter described, while the middle part of the label will lie between the receiver 19 and a mold in the wheel $k$. By slightly changing the position of some of the devices described one pair of the feeding-rollers may be omitted, but for accuracy of operation two pairs are preferred.

The devices to prevent the feeding of a label from the pile when for any reason a package to which such label would in the normal operation of the machine be applied is absent from the feed-chain $v$ consist, in addition to some of the devices already described, of a supplemental slide 76, secured to the main slide 45 by a spring 77 and carrying a rod 78, fixed to an arm 79, extending up from the rear end of the slide and running through guides 80, fixed to the frame of the machine. The free end of the rod 78 is provided with a notch 81, so shaped as to permit the rod to move forward freely under pin 82, at the end of stationary rock-arm 83, which is lightly pivoted to standard 84; but when the end of rod 78 moves backward under pin 82 and the pin rests without restraint upon the end of the rod it will drop into the notch and hold the rod and the supplemental slide 76 stationary, while the main slide moves backward to its full limit through the extension of spring 77, as seen in Fig. 6. A pin 85, fixed to and projecting from the frame 43, rides upon the upper edge of the supplemental slide, which is provided with a cam or double incline 86, dividing such edge into a lower part 87 and a higher part 88, and there is also a cam or incline 89, fixed to a standard and in the path of pin 85, whereby whenever the backward movement of the supplemental slide is stopped by the engagement of pin 82 with the notch on the end of rod 78 the continued backward movement of main slide 45 will draw pin 85 from the lower part 87 of the supplemental slide over the double incline 86 to the higher part 88, where it will be locked by its then adjacent incline, and this pin 85 so long as it rests on the higher part 88 will prevent the frame 43 from rocking downwardly on its pin 44, and thereby hold the starting-roller 41 out of feeding contact with the top label of the pile. As the main slide is moved forward from the position shown in Fig. 6 the pin 85 rides up on the incline 89 and unlocks the pin from the incline 86, when the extended spring 77 contracts and pulls the supplemental slide back to its normal position against the upturned rear end 90 of the main slide, and pin 85 rests over the lower edge part 87 as the slides are moved backward together and is in position to be raised over the incline 86 whenever the backward movement of the supplemental slide is stopped by the locking engagement of the rod 78 with pin 82 of rock-arm 83. The operation of these devices to feed a label when a package is on the feeding-chain $v$ above the starting-roller 41 on its way to the label-applying position and to prevent the feeding of a label when no package to which such label would be applied is being fed is stated as follows: Projecting arm 32 is secured to arm 83 and is so constructed and arranged that its free end overhangs the package-carrying chain $v$ and at such distance above the chain that it will come in contact with the forward edge of a package as it is fed along and will rock arm 83 and lift its free end sufficiently to prevent pin 82 from dropping into the notch 81 as the rod 78 is drawn backward by the supplemental slide 76, to which it is attached, and consequently the backward movement of the slide will not be stopped and pin 85 will not be drawn over the double incline 86 and held on the higher part 88 to prevent the starting-roller 41 from dropping into feeding contact with the top label, as seen in Fig. 5; but when no package is present the arm 83 will not be lifted and the pin 82 will drop into notch 81 as the end of rod 78 is drawn backward under the pin and the rod and its slide 76 will be stopped, while the main slide will continue its backward movement and draw the pin 85 over the double incline 86 and upon the higher part 88, where it will be retained until it is released by its contact with incline 89, and the starting-roller 41 will be prevented during its forward movement from dropping into feeding contact with the top label, and consequently no label will be fed by such movement.

*Label paste-applying devices.* (See Figs. 1, 5, and 11.)—The devices for applying paste to the forward end of a label after it has been delivered upon the rocking apron 75 consist of paste-reservoir 91, paste-delivery roller 92, paste-taker and paste-applying bar 93, guide 94, and means for operating the roller and bar. The bar 93 consists of a pin or bar extending across the end of the label and having its lower side provided with proper material for taking the desired quantity of paste from the roller 92 and applying it to the end of the label. This bar is fixed to bar 95, which is pivoted to rock-lever 50, by which it is given substantially the same forward-and-backward movement as is given to connecting-bar 52, which operates slide 45, the range being sufficient to carry the bar 93 to the roller 92 and then back to and upon the end of the label. Paste-roller 92 is provided with a ratchet and pawl 96, arranged to prevent the roller from rotating forward, and the bar 95 carries a hook 97, pivoted thereto and held down upon bar 93 by spring 98, and is so arranged relatively to the roller 92 that when the bar 93 is in contact with the roller the hook will engage with a tooth on the ratchet and as the bar recedes the hook will cause the roller 92 to rotate backward to present a fresh surface of paste to the next contact of the bar 93 therewith, as shown in Fig. 12. The bar 93 is directed in its movement to and from the paste-delivery roller by a slotted guide 94, formed in the frame of the machine, in which the bar travels, and this guide as it approaches the paste-applying line descends rather abruptly to permit the bar to drop with the desired force upon the label.

*Devices for introducing the packages into the molds and folding the labels around them.* (See Figs. 1, 2, 3, 4, 5, 6, 9, 11, and 12.)—When a label has been fed into the position shown in Fig. 5, with its middle part over a mold in wheel $k$ and below receiver 19 and its forward end, to which paste has been applied, resting on apron 75, plunger 18 forces the package from the receiver into the mold, the middle part of the label being carried into the mold by the advance of the package, and thereby folded around its under side and edges, the movable bottom 2 of the mold, which is held at the top thereof when the mold is empty, being forced down by the advance of the package. The plunger 18 moves in guides 99, fixed to the frame of the machine, and is provided with an upwardly-extending guide-rod 100, which passes freely through a guide-hole in standard 101 and is pivoted to the upper end of lever 102, which in turn is pivoted to one end of bell-crank lever 103, which is journaled in fixed arm 104 and is rocked by cam-roller on its opposite end running in cam-groove in left-hand face of wheel $g$ to give the desired vertical movement to the plunger. The receiver 19 is fixed to the frame of the machine and is provided with hinged bottom pieces 105, which swing downward to permit the package to pass out under the pressure of the plunger and are returned to and held in their normal position by springs 106, the walls of the receiver extending down near the top of the mold to provide guides for the package.

When a package and a label have been pressed into a mold, as just described, the rear and forward ends of the label, which have been thrown upward by the introduction of the package, are still to be folded over upon the upper side of the package and sealed in place. The rear end of the label is first folded over by the action of the forward end of an apron-folder 107, which in its normal or stationary position is just back of the package-receiving mold and is united to the rear part thereof by hinged connection 108. This folder 107 is moved forward and backward to do the work by its attachment to the end of lever 91, the forward part of the folder being attached thereto by a spring 109 and the rear part directly or through the pintle of the hinge, and this lever is actuated through its pivoted connection with lever 8, which is actuated as hereinbefore described. Pivoted to lever 91 at a short distance from its end is a bell-crank lever 110, the upper arm of which carries a pin 111, which underlies the forward end of the folder 107, while the end of its lower arm rests against a double-beveled head 112 of a spring-controlled pin arranged to move slightly up and down in a case attached to lever 91, whereby the bell-crank lever is held in different positions according as its lower end rests upon one or the other side of head 112, to which it is shifted by the contact of its upper arm with pins 113 and 114, fixed in the frame of the machine. The purpose of this construction is to raise the forward end of folder 107 by rocking it upon its hinge 108 when it has completed its forward stroke from the position shown in Fig. 9 to that shown in Fig. 10 by the contact of the upper arm of lever 110 with pin 113 and to hold it in the raised position during its backward stroke till the arm strikes pin 114, when the end of the lower arm will be shifted to the opposite side of head 112 and the forward end of the folder will be brought down by spring 109 to its folding position. The folder 107 begins its folding movement as soon as the plunger 18 withdraws from the mold, and it is arranged to move forward more rapidly than the mold-wheel, so that when the wheel has reached its next stopping-place the rear end of the label will have been folded in place and the folder will be ready to begin its return. The forward end of the label is folded over upon the package to overlap its opposite folded end and be sealed thereto by the free end of apron 75 when raised and by a small stationary roll 115, fixed to the under side of apron 75 by a spring 116, to bear upon the label and press it into close contact with the package and its opposite edge, and this folding is done by the movement of the package under the apron and roll. The normal position of the apron 75 is, as shown in Fig. 5, with its free end or edge resting in a notch 117, formed in the top of the partition-wall, so as not to interfere with the forward feed of the labels, and it is forced and held down by spring 118, connecting the apron to its shaft 119, and when in this position the roll 115 presses the label down upon the package. It is, however, necessary to raise the free end of apron 75 from its normal position in order that the folder 107 may enter beneath it to fold the end of the label upon the package, as seen in Figs. 9 and 10, and to accomplish this an arm 120 is fixed to end of shaft 119, the end of the arm being provided with an outer convex and an inner concave curved surface 121, while a projecting pin 122 on connecting-bar 95 in its forward movement comes in contact with the outer curved surface to rock the bar 120 upward and rotate the shaft 119 against the stress of spring 123, and thus lift the free edge of the apron through its connection with the shaft by spring 118 and hold it in the raised position until pin 122 passes off of the curved outer surface, during which time the folder enters to do its work, and the apron under the stress of its spring 118 is then returned to its normal position, with its free edge resting in notch 117, while pin 122 on the reverse movement of bar 95 contacts with the inner curved surface, and by rocking arm 120 in the opposite direction removes the curved surface from the path of its backward movement.

*Mechanism for feeding the stamps to the packages.* (See Figs. 1, 2, 3, 5, 13, and 14.)— The stamps (revenue or other stamps, generally consisting of long narrow strips of printed paper) are fed to the package in the mold at its second stopping-place from where the package is introduced into the mold and transversely to the movement of the mold-wheel *k*. The stamps S are fed from the top of a pile contained in a box 124 and supported on a movable platform 125, which is arranged and operated substantially like platform 34 of label-box 33, as seen in Fig. 3, and the box 124 is located on one side of the mold-wheel, while on its other side are devices for seizing the stamps when they have been separated or started from the pile and drawing them past the paste-applying devices and over the packages in the molds of the wheel.

The stamps are started from the top of the pile by a reciprocating pusher 126, whose contact stamp-surface 127 is of a material which will give the desired frictional engagement, preferably of spongy india-rubber. This pusher, as shown in the drawings, has a four-motion feed—namely, forward, upward, backward, and downward—and these motions are given by pivoting the pusher to the top of lever 128, whose lower end is fastened to the upper end of spring 129, which is fixed, preferably adjustably, at its lower end to arm 130 or other stationary part of the machine. The lever is slot-pivoted at 68 to the frame of the machine or otherwise arranged so as to allow a slight up-and-down as well as a rocking movement, and it is actuated by its connection through a slot 131, formed therein, with a pin 132, fixed eccentrically in the face of rotating disk *r* on counter-shaft *m*, by which as the pin through its contact with the side walls of the slot forces the lower end of the lever backward or forward it causes the pusher to move in the opposite direction by the rock of the lever upon its intermediate pivot. The object of spring 129 is to draw the pusher down and hold it in feeding contact with the top stamp of the pile whenever it is free to exert its force thereon and also through its flexibility to permit the desired movement of the lower end of the lever under the action of the rotating pin-and-slot connection. The pusher is raised against the stress of the spring to permit it to move backward out of feeding contact with the top stamp by the engagement of pin 132 when approaching its highest point of rotation with the head of slot 131, which lifts the lever and pusher bodily and holds them up until the pin in its further rotation reaches a point sufficiently low to cause the resistance to the pull of the spring to be shifted from the pin to the pusher, whereby the latter is drawn and held into feeding contact with the top stamp until the pin is again brought into lifting engagement with the head of the slot. The pusher 126 starts and moves the top stamp forward far enough (the next lower stamp being held by devices hereinafter described) to be seized by reciprocating tongs 133 and drawn past and in contact with devices for applying paste to the stamp and over a package in a mold in wheel $k$, as seen in Figs. 13 and 14, the tongs when at rest being located on one side of the wheel and the stamp-box on the other side thereof. The tongs consist of a fixed part 134 and a movable part 135, pivoted together at 136, and they are arranged to slide forward and backward to the desired extent on a track or way 137 through the pivoted connection of the fixed part with the upper end of lever 138, which is pivoted to a standard of the machine and is rocked by the engagement of pin 139, fixed eccentrically in the face of rotating disk $s$ on counter-shaft $n$, with slot 140 in the body of the lever, as seen in Figs. 13 and 14. Back of the pivot 136 of the tongs is a catch 141, pivoted to fixed part 134 and arranged to hook over a pin or other projection 142 on movable part 135 and hold the tongs open or keep their jaws or forward ends apart, and the tongs are brought from the closed to the open condition at the limit of their backward movement by the contact of the downwardly inclined or curved rear end of part 135 with a fixed projection 143, whereby this end is lowered, the spring 144, on which it rests, being contracted, and the forward part or jaw of 135 is raised out of contact with jaw of part 134 and the pin 142 is brought into such relation to catch 141 that the latter falls or is forced by its spring over the pin, and the tongs are thus opened and held open till the engagement of the pin and catch is broken, which is effected at the limit of the forward movement of the tongs by the striking of the catch 141 against a projection 145, fixed to the frame of the machine, and causes the tongs to be instantly closed by the expansion of spring 144 to seize the forward end of a stamp, if present, and to remain closed until the rear end of part 135 is again brought into contact with projection 143 to force them open, as described. In order to disengage a stamp from the tongs at the proper time, so that it shall rest upon a package with an equal overhang of its ends, as seen in Fig. 17, a vertical slot 146 is formed in the ends of the jaws of the tongs and a discharger 147 is arranged in the slot to move with the tongs, but at the proper time come to a stop, while the tongs move past it, and thus disengage and discharge the stamp, causing its forward end to drop from the tongs at the point where the discharger becomes stationary. This discharger also provides an abutment or gage to limit the extent of the entrance of the forward ends of the stamps into the tongs, and consequently for uniformity in the point of their discharge therefrom. For this purpose the discharger is fixed to the end of rod 148, which forms the forward part of a supplemental slide 149, connected to the rear end of part 134 of the sliding tongs by means of a spring 150, whereby the slide 149 and the discharger carried thereon have a conjoint forward-and-backward movement with the tongs 133; but the slide 149 may be stopped and the tongs, through the expansion of spring 150, have an independent backward-and-forward movement. A screw 151, preferably adjustable, passing through pin 143 in the path of slide 149, furnishes a stop to its backward movement, and the screw 151 is so adjusted and the other parts are so related that the backward movement of the discharger will be stopped at the point where the forward end of the stamp should be discharged from the tongs to bring the stamp into proper position to the package to which it is to be applied. The relation of the parts is such that the instant the rear of slide 149 strikes against screw 151 and the discharger is stopped the inclined rear end of part 135 of the tongs is sufficiently in contact with pin 143 to open the tongs and release their grip on the stamp, and as they continue their backward movement their forward slotted ends are drawn past the now stationary discharger and away from the forward end of the stamp which is in contact with discharger until they have passed just back or free of the stamp, at which time the tongs have reached their backward limit, and when their forward movement commences the discharger remains stationary, the slotted ends of the tongs moving forward past it until the expanded spring 150 has returned to its normal condition, when the tongs and the discharger will move forward together, and when they have reached their forward limit the discharger will be in position to act as a gage to limit the insertion of the end of the stamp in in the tongs, as already explained.

To prevent the feeding of a stamp in case no package is in the stamp-applying position in the mold-wheel, devices are employed to hold the pusher 126 out of feeding contact with the top stamp of the pile until a package is in position. As shown in Figs. 3 and 13, these devices consist of a bell-crank lever 152, pivoted to a fixed part of the machine and controlled by a spring 153, so that when in its normal position against a stop or projection, as 154, the end of arm 155 will be under and in contact with a pin or projection 156, fixed to lever 128 slightly above the head of slot 131, when this pin and its lever 128 are raised by the lift of pin 132 upon the head of slot 131, and inasmuch as lever 128 carries the pusher 126 and is supported upon the end of arm 155 of lever 152 through pin 156 so long as this lever is in its normal position, which is its position when no package is present, the pusher will be raised and held against the tension of spring 129 out of feeding contact with the top stamp of the pile. Whenever a package is present, the lever 152 is forced from its normal position and the end of arm 155 is thrown out of contact with pin 156 and the pusher under the tension of spring 129 is brought into feeding contact with the stamps. This is effected through the action of the other end 157 of lever 152 upon the lower ends of rods 3, which support the movable bottoms 2 of the molds, the end 157 of the lever being so related to these rods that when they are pushed down or toward the center of wheel $k$, as is the case when packages are in the mold, the end 157 will lie across the path of the rods, and this end is so shaped that it will be forced outward or laterally away from the rod, causing the lever 152 to rock on its fulcrum and forcing the end of arm 155 from beneath the pin 156, thus releasing the pusher from its raised position and bringing it under the action of spring 129 into feeding relation with the top stamp. This construction and operation are shown in full and dotted lines in Fig. 13, and in Fig. 13$^c$ there is shown in plan view the end 157 of lever 152 in its relation to the rods 3 when such rods are pushed toward the center of the wheel by the presence of packages in the molds, the shape of such end of lever being inclined or cammed, so that as the rod moves over such inclined edge it will gradually force the lever laterally and rock it upon its fulcrum to produce the desired result.

The devices for retaining the next under stamp in place while the top stamp is started and fed from the pile preferably differ somewhat from the construction heretofore described for retaining the labels in place, and consist of a pointed blade 158, whose rear cutting edge 159 as it approaches its point is inclined backward to form an obtuse angle with the plane of the stamps, so that as the top stamp is drawn forward it will ride upon the inclined cutting edge to give what is known as a "drawing cut," by which the slit from the piercing-point of the blade to the rear edge of the stamp will be made more easily and with less liability of tearing the paper than if the cutting edge were at right angles to the plane of the stamps or no vertical movement or drawing-cut between the blade and the stamp were permitted. In the construction shown in Figs. 13, 13$^a$, and 13$^b$ the blade 158 is fixed, preferably adjustably, in a frame or support 160, secured to the rear walls of the stamp-box or other convenient point, so that by the upward force of the spring-controlled platform 125 the point of the blade will penetrate two or more of the stamps, as may be desired. To properly control the top stamp as it is acted on by the cutting-blade to prevent its rear end from rising too quickly or too much, and thus destroying the proper cutting-angle between the stamp and the blade, and to permit the stamp to buckle or curve up in cross-section as it approaches the blade, a guide-frame is attached to the rear wall of the box or other fixed point, against the under side of which the stamps are pressed by the platform. This frame consists of a rear part 161, whose under side is flat to hold the rear end of the stamp down as it is drawn toward the blade, and two side pieces 162, one on either side of the blade, having their under surfaces inclined or curved upward in two directions longitudinally or in the direction of the movement of the stamp and laterally or at right angles to the longitudinal curve, as seen in Figs. 13 and 13$^a$, to permit the stamp to rise or ride up on the incline of the blade and to be curved or buckled in cross-section opposite the blade. It will be understood that this construction is not limited to feeding of stamps as distinguished from labels or to a machine of substantially the construction herein described and shown, but may be employed to advantage in any construction where it is desired to start and feed sheets of paper or similar material from the top of a pile.

*Stamp paste-applying devices.* (See Figs. 1, 2, 13, and 14.)—A simple construction and arrangement for applying paste or other adhesive material to the stamps consists of a paste-reservoir 164, conveniently secured to the front wall of stamp-box 124 and located between the same and the mold-wheel $k$, and a paste-delivery roller or rollers 165 conveniently journaled in the walls of the reservoir and rotated by pulley 166 on roller-shaft through its belt connection 167 with driven pulley $q$ on counter-shaft $m$. In the construction shown in the drawings there are two paste-delivery rollers fixed to the same shaft and located at such distance apart as to apply lines of paste to the edge surfaces of the stamps and to permit the forward end of tongs 133 to pass between them to seize the forward end of the stamp and draw it over the peripheries of the rollers and under a spring or other presser 168, which operates to force and hold the stamp into paste-receiving contact with the rollers, as shown in Figs. 3, 11, and 14.

*Devices for folding the stamps over the packages and sealing them in place.* (See Figs. 1, 2, 3, 4, 13, and 14.)—As soon as a stamp has been fed over a package in a mold, as described, a presser-folder 169 comes down upon the stamp to press its middle part into sealing contact with the top of the package and, in connection with the laterally-swinging wings 170, to fold its overhanging ends down upon the ends of the package and hold them in this position till the package is expelled from the mold. The presser-folder is composed of a top piece 171, carrying the folding ends 172, which are of a shape and size to enter readily the recesses 173 in the free ends of the folding wings, and the top piece is movably and elastically connected to a bottom piece 174 by means of headed screws or pins 175 passing loosely through the top piece and fixed to the bottom piece, the top and bottom pieces being normally and elastically held apart by interposed springs 177. The folder is secured to the end of rock-lever 178, fixed to shaft $u$, which is rocked in its bearings to give the desired vertical movement to the folder by its connection through roller-carrying arm 179 with peripheral cam on wheel $j$. A pair of folding and holding wings 170 for each mold in the wheel are attached to arms 180, which are pivoted to arms 181, extending from the web of the wheel, and arms 180 are controlled by springs 182 or other means, whereby the wings 170 are normally pressed and held against the ends of the packages when present in the molds. These wings are of a size and shape to readily enter the openings in each end of the molds, and, as stated, their extreme edges are cut away to form recesses 173 for the reception of folding ends 172, as seen in Figs. 15 and 18, and they are opened or swung away from the molds to permit the folding ends to fold the stamp over the ends of the packages, as seen in Fig. 17, by the downward movement of forked arms 183 in contact with curved tailpieces 185 on arms 180, arms 183 being fixed to rock-shaft $t$, which is rocked to give the desired vertical movement to the arms by its connection through roller-carrying arm 186 with peripheral cam on wheel $f$. The bottom piece 174 of the presser-folder 169 presses the stamp down upon the top of the package with a force equal to the resistance of springs 177 before the folding ends 172 are forced down by the contraction of the springs to fold and carry the ends of the stamp partially into place on the ends of the package when the wings 170, which have been momentarily open, swing inward against the ends of the stamp to complete the folding thereof and thereafter press the ends of the stamp against the ends of the package till the latter is expelled from its mold, and then the folding ends 172 are raised before the wheel moves forward through the action of rock-lever 178, the bottom piece 174 continuing to press the stamp upon the top of the packages until the springs are restored to their normal condition.

The packages to which labels and stamps have been applied, as hereinbefore set forth, are expelled from their molds near the lowest point in the rotation of the wheel $k$ by forcing the movable bottoms 2 toward the top or mouth of the molds by means fully set forth under the heading "The mold-wheel." The flanges 20 on the ends of the movable bottom 2 are serviceable in protecting from injury the ends of the packages as they are expelled from the molds, inasmuch as they are brought into contact with the wings 170 and force them away from the ends of the packages. This is especially the case when the ends of the packages are countersunk to form a raised marginal bead, as seen in Figs. 13, 17, and 18. When expelled from the molds, the packages may be received upon an endless moving belt, as $z$, and conveyed to any desired point.

It is obvious that in the machine hereinbefore described, and illustrated in the drawings, there are two package-carriers, one being the endless chain, which carries the packages to the receiver or the label-applying position, and the other the mold-wheel, which carries the packages from the label-applying position to the stamp-applying position, and thence to the package-expelling position.

*Modification of label-feeding devices.* (See Figs. 19, 20, and 21.)—A modification of the devices for starting and feeding the labels, which is also applicable for starting and feeding the stamps or sheets of paper or similar material from the top of a pile for almost any purpose, is shown in Figs. 19, 20, and 21 of the drawings and by reference thereto is described as follows: Instead of the construction shown in Figs. 5, 6, 11, and 12 for starting the labels from the top of a pile and feeding them into the bite of the first pair of rollers 64, which consisted, essentially, of a non-rotating roller 41, pressed upon the top label, and by its connection through rocking frame 43, link 51, and bar 52 with the upper end of rock-lever 50 the desired forward-and-backward movement was given, there is substituted in the modification two rotating starting and feeding rollers 187 and 188, journaled in the frame of the machine and resting in contact with the top label of the pile and means for rotating the rollers. There is also shown additional devices for more effectually retaining the under labels in place while the top label is started and fed along; also, different devices for bringing a stop or line of projections into and removing it from the path of the top label before it enters the bite of the first pair of feed-rollers. The rollers 187 and 188 have a part, preferably about one-third, of their peripheral surfaces roughened or covered with sandpaper 189 or otherwise treated to make feeding contact with the top label, while the remainder of their surfaces is left plain and smooth, so that they will rotate in contact with the labels without moving them, and they are driven by a chain 190, passing over sprocket 191 on the shaft of roller 187 and over sprocket 192 on shaft 193, to which is fixed gear-wheel 194, which is rotated from gear-wheel 67, hereinbefore described, by the intermesh of the intermediate gears 195 and 196, and roller 188 is driven from roller 187 by connecting-chain 197, passing over sprockets on the shafts of the two rollers. The rollers are so arranged on their shafts that their roughened surfaces are brought in contact with the top label simultaneously to start and feed it forward to bring its forward end into the bite of the first pair of feed-rolls 64, by which the top label is drawn from beneath the smooth surfaces of the rollers 187 and 188, which do not have sufficient frictional contact to start or disturb the next label of the pile. The construction and operation of the pairs of feed-rolls 64 and 65 and the application of paste to the forward ends of the labels is the same as hereinbefore fully described. The arrangement and means for raising and lowering the pins or projections 58, as shown in Figs. 20 and 21, are somewhat different from that hereinbefore described, though their object is the same—namely, to provide a gage or stop against which the forward ends of the labels come in contact and are bent or buckled up, and when the stop is removed the forward ends of the labels will spring into the bite of the contiguous feed-rollers; also, to provide that the labels be seized by the feed-rollers 64 at uniform intervals, irrespective of whether their ends are in the same vertical plane in the box, as hereinbefore fully explained.

In the modified construction the pins 58 are fixed to shaft 198, journaled in bearings in the frame of the machine and rocked to raise the pins into the path of the forward end of the label and to lower them from such path by the contact of a double-cammed surface 199 on arm 200, with a pin 201 on arm 202, fixed to shaft 189, arm 200 being pivoted to and moving forward and back with lever 50 and arms 200 and 202 being held in their normal positions by springs 203 and 204. A bridge-plate 176, secured to the front wall of the label-box and projecting between the rollers 64, preferably has its free edge provided with slots through which the pins 58 pass as they are raised and lowered, and to locate the stop as near the bite of the rollers 64 as possible the lower roller is grooved to receive the ends of the stop-pins. As the arm 200 is moved forward the free end of arm 202 is lifted by the contact of pin 201 with the upper surface of cam 199, causing shaft 198 to rotate backward and pins 58 to rise enough to provide a stop for the end of the label, and when the pin has reached the limit of the upper cammed surface the movement of arm 200 is reversed, and under the action of spring 204 and the lower cam-surface shaft 198 is rocked in the opposite direction and the pins 58 are lowered from the path of the buckled-up forward end of the label, which jumps into the bite of rolls 64. The additional devices in the modified construction for holding the under labels in place while the the top label is started and fed forward consist of a rock-shaft 205, journaled to its bearings, fixed to the frame in rear of the label-box, and having two arms 206 fixed thereto, carrying sockets 207, in which downwardly-projecting pins or needles 208 are held, preferably adjustably, to pierce and hold the under labels as soon as the rear part of the top label has passed them. One of the arms 206 is extended to rest upon a pin 209, eccentrically fixed in the end of roller 187, and is pressed down thereon by spring 210, the pin being so arranged relatively to the roughened or feeding surface of the roller that when the rear of the top label has moved just beyond or in front of the needles they will be lowered by the lowering of pin 209, which supports the needles through the extended arm and will pierce the under labels with a force proportionate to the strength of spring 210. As the rotation of the roller raises the pin and the extended arm sufficiently the needles will be lifted to permit the forward feed of the next label of the series.

The principle of the modification to prevent the feeding of the top label of the pile when no package will be in place to receive such label consists in so disconnecting roller 187 from its driving devices that it will not rotate when no package is in place, and this is accomplished by the following devices, some of which are substantially the same as hereinbefore described: An arm 83, pivoted to standard 84, carries an arm or piece 32, projecting over the carrying-chain v at such height that its free edge will come in contact with the edge of a package as it is fed upon the chain and will rock the arm 83 upon its pivot and hold it in that position while the package passes under arm 32. Fixed to arm 83 at its pivotal point is a downwardly-projecting arm 211, whose free end in its normal position rests against the free end of arm 212, which is pivoted to the frame of the machine and normally rests upon a fixed pin 213. The function of the parts 211 and 212 will be hereinafter described. Starting-roller 187 is fixed to shaft 214, and sprocket 191 on the end of same shaft is free to rotate thereon except when it is fixed thereto by the engagement of pawl 215, fixed to the sprocket, with a ratchet 216, fixed to the shaft 214. When the pawl and ratchet are in toothed engagement, the roller 187 is driven from the sprocket 191, and when they are separated the shaft and roller cease to rotate and the sprocket simply rotates on the stationary shaft 214, carrying its pawl with it, while the ratchet remains stationary. The pawl is pivoted to an arm 217, fixed to the sprocket, and is pressed into contact with the ratchet by a spring 218 and is provided with an arm 219, which is so related to arms 211 and 212 that when they are in their normal positions and when the arm 219 is near its highest point of rotation, as seen in Fig. 21, it will strike against the under surface of the end of arm 212 and disengage the pawl from the ratchet and stop the rotation of the shaft 214 and the roller 187, fixed thereto, and no label will be started and fed forward, because both of the rollers are stationary, and this will be the position of the parts and their operation when there is no package in its proper position on the feeding-chain. When, however, a package is present, the arm 83 will be rocked on its pivot by the contact of arm 32 with the package, the lower end of arm 211 will be carried beyond the end of arm 212, and the latter arm then will not provide the requisite resistance to throw pawl 215 out of its engagement with the ratchet 216, and the rollers 187 and 188 will then start and feed a label to be applied to the package, which is moving under the lifting-arm 32, the position of the various parts when a package is present being indicated by dotted lines in Fig. 20.

It is evident that the various operative devices of the machine are so timed through their connections with the parts by which they are actuated that they will perform their work in proper succession and at proper times to produce the desired results; also, that the several cams and other actuating parts are so constructed, arranged, and controlled as to give the devices operated thereby the requisite movements to do the work hereinbefore fully pointed out.

It is remarked that it is not intended to limit the present invention to the exact construction herein described and shown in the drawings or to a machine containing all the devices or combinations or equivalents thereof as shown and described, inasmuch as it is evident that a device or set of devices may differ from those herein described and yet contain the principle of the invention or some important part thereof and that a machine may in many features of its construction and operation differ radically from the machine herein described, while in other particulars it may embody the devices and combinations of parts or some of them substantially as herein described and claimed. It is further remarked that although the present improvements have been herein described and shown in the drawings as embodied in a machine for applying labels and stamps to packages it is evident that they or many of them may be used to equal advantage for feeding, pasting, or folding sheets of paper or similar material for other purposes.

The operation of the several devices and groups of devices or mechanisms which compose the operative parts of the machine has been so fully pointed out in connection with their construction and combination with other parts that the operation of the machine as a whole will be readily understood without further description.

What is claimed as new is—

1. The combination, substantially as set forth, in a mechanism for starting and feeding labels or similar sheets and applying them to packages, of starting devices to engage and start a label, devices for feeding the label to the applying position, a carrier to feed the packages to such position and means coacting with the carrier and the starting devices to prevent the latter from engaging and starting a label when a package is absent from its proper position on the carrier.

2. The combination, substantially as set forth, in a mechanism for starting and feeding labels or similar sheets and applying them to packages, of continuously-operating starting devices for engaging and starting a label, devices for feeding the label to the applying position, a carrier to feed the packages to the said position and means coacting with the carrier and the starting devices to prevent the latter from engaging with and starting a label when a package is absent from its proper position on the carrier.

3. The combination, substantially as set forth, in a mechanism for starting and feeding labels or similar sheets and applying them to packages, of starting devices to engage and start the label, devices for feeding the label to the applying position, a continuously-moving carrier to feed the packages to the said position and means coacting with the carrier and the starting devices to prevent the latter from engaging with and starting a label when a package is absent from its proper position on the carrier.

4. The combination, substantially as set forth, in a mechanism for starting and feeding labels or similar sheets and applying them to packages, of starting devices to engage and start a label, devices for feeding the label to the applying position, a carrier to feed the packages to the said position provided with devices to position the packages thereon at uniform distances apart and means coacting with the carrier and the starting devices to prevent the latter from engaging and starting a label when a package is absent from its proper position on the carrier.

5. The combination, substantially as set forth, in a mechanism for starting package-labels or similar sheets from the top of a pile and feeding them to a position for applying them to packages, of a device arranged and operating to engage and start the top label of the pile, a device for feeding packages to the label-applying position and devices coöperating with the package-feeding device and the label-starting device to hold the starting device out of feeding contact with the top label of the pile when a package to which such label should be applied is absent from the package-feeding device.

6. In a mechanism for starting labels or similar sheets from the top of a pile and feeding them to a position to be applied to packages, the combination substantially as set forth, of a label-starting device, a main slide by which the starting device affixed thereto is moved forward and backward, a supplemental slide having a conjoint and independent movement relatively to the main slide, a package-carrier, devices for stopping the backward movement of the supplemental slide before that of the main slide is stopped when no package for the top label of the pile is on the carrier, and coacting devices carried by the main and supplemental slides, whereby the starting device during its forward movement is held out of contact with the top label of the pile.

7. In a mechanism for starting and feeding package-labels or similar sheets from the top of a pile to a package-applying position, the combination substantially as set forth, with a package-carrier, a main slide 45, a rocking frame 43 fixed to and moving forward and backward with the slide, and a label starting and feeding device mounted on the frame, of a supplemental slide 76, devices for stopping the backward movement of the supplemental slide before that of the main slide is stopped when a package for the top label of the pile is absent from the carrier, and coacting devices carried by the rocking frame and the slides respectively, whereby the starting and feeding device during its forward movement will be held out of feeding contact with the top label of the pile.

8. In a mechanism for starting and feeding package-labels or similar sheets from the top of a pile to a position to be applied to packages, the combination substantially as set forth, with a package-carrier, a main slide 45, a rocking frame 43 fixed to and moving forward and backward with the slide and carrying a laterally-projecting pin 85, and a starting device 41 mounted on the frame, of a supplemental slide 76 arranged to move conjointly with and independently of the main slide and having its upper edge provided with a lower section 87, a higher section 88 and a locking projection 86, and devices for stopping the backward movement of the supplemental slide before that of the main slide is stopped when a package for the top label of a pile is absent from the carrier, whereby the pin 85 will be drawn over projection 86 and retained on the higher section 88 to hold the starting device as it moves forward out of starting contact with the top label.

9. The combination, substantially as set forth, of a package-carrier $v$, a vertically-rocking arm 83, a finger or feeler 32 affixed to arm 83 and overarching the carrier, a label-starting device 41, a rocking frame 43 having a laterally-projecting pin 85, a main slide 45, a supplemental slide 76 having lower section 87, higher section 88, and intermediate locking projection 86 and carrying locking-rod 78, a spring 77 connecting the two slides, unlocking incline 89, and means for giving the desired forward-and-backward movement to the slides, for the purposes set forth.

10. The combination, substantially as set forth, in a mechanism for starting and feeding package-labels or similar sheets from the top of a pile, with a starting and feeding device located and operating above the pile and additional feeding devices located and operating forward of the pile, of a stop located between the top and forward feeding devices and means for bringing the stop into and removing it from the path of the top label as it is fed forward, for the purpose set forth.

11. The combination, substantially as set forth, in a mechanism for starting and feeding package-labels or similar sheets from the top of a pile, with a starting and feeding device located and operating above the pile and a pair of feed-rollers located in front of the label-box, of a bridge between the label-box and the pair of rollers provided with slots, and a series of stop pins or projections and devices for raising the pins into and lowering them out of the path of the top label, for the purpose set forth.

12. The combination, substantially as set forth, of a mold-wheel, a hinged folder overlying the periphery of the wheel, devices for moving the folder forward and backward over the wheel, means for holding its forward end in folding position during its forward movement, and means for raising its forward end as it is moved backward.

13. The combination, substantially as set forth, of a vibrating lever 91 to which folder 107 is secured and by which it is moved, a bell-crank lever 110 pivoted to lever 91, a pin 111 projecting from the upper arm of lever 110 and underlying the forward end of the folder, a beveled spring-controlled head 112 to hold the lever in position, and fixed pins 113 and 114 to rock the lever 110 to raise the forward end of the folder and hold it in the raised position during its backward movement and to release it therefrom.

14. The combination, substantially as set forth, of a mold-wheel, a forward folder 75 hinged or arranged to rock over the periphery of the wheel, means to force and hold the free end or edge of the folder upon the wheel, devices for raising such edge in position to fold over the forward end of a label and to permit the rear folder 107 to enter beneath it, and a small roller fixed to folder 75 and arranged to press the forward gummed or pasted end of the label upon the package and form it into an overlapped seam with its rear end.

15. The combination, substantially as set forth, with a mold-wheel, a folder 75, a shaft 119, and springs 118 and 123, of an arm 120, an outer convex and an inner concave curved surface fixed to the arm, a projection 122 and reciprocating arm 95 to which the projection is attached, for the purpose set forth.

16. The combination, substantially as set forth, in a mechanism for applying paste to package-labels or similar sheets and folding them around packages, of a mold-wheel, paste-applying devices, a hinged or rocking folder 75, devices for pressing and holding the free edge of the folder upon the periphery of the wheel to serve as a platform or support for the forward end of a label when paste is applied thereto, and devices for raising its free edge to act as a folder.

17. The combination, substantially as set forth, in a mechanism for applying stamps or similar sheets to packages, of a mold-wheel, a box for holding a pile of stamps, devices for starting the top stamp of the pile and paste-applying devices, located on one side of the wheel, and devices for seizing and drawing the stamps across the line of rotation of the wheel and over the packages, located when at rest on the opposite side of the wheel, but capable of being moved across the wheel to seize the stamps, and devices for applying the stamps to the packages.

18. The combination, substantially as set forth, in a mechanism for starting and feeding package-stamps or similar sheets from the top of a pile, of a pusher 126, a lever 128, pivoted to permit of vertical play and carrying the pusher and provided with a slot 131, an eccentrically-rotating pin in engagement with the slot, and a spring by which the lower end of the lever is secured to a fixed point, whereby the pin by its rotation in contact with the head of the slot will raise the lever and pusher, move the pusher backward, then permit the tension of the spring to draw the pusher into feeding contact with the top of the stamp and then move it forward to start and feed the stamp.

19. The combination, substantially as set forth, in a mechanism for feeding labels or similar sheets, of a lever fulcrumed to permit of vertical play, a spring connecting the lower end of the lever to a fixed point and an eccentric rotary pin in engagement with the lever between its fulcrum and its spring attachment, whereby a four-motion feed is given to a feeding device attached to the free end of the lever.

20. The combination, substantially as set forth, in a mechanism for starting and feeding package-stamps or similar sheets from the top of a pile, with a device to engage and start a stamp, of a pointed blade located behind the starting device to pierce one or more stamps and hold the under ones in place while the top one is advanced and having its rear edge inclined and sharpened, and devices for controlling the rear end of the top stamp, whereby it will be presented to the blade to receive a "drawing cut," substantially as described and shown.

21. The combination, substantially as set forth, with a pointed blade having its rear edge sharpened and inclined at an obtuse angle to the plane of the stamps, of a guide-frame consisting of rear piece 161 and curved side piece 162, substantially as and for the purpose set forth.

22. The combination substantially as set forth, with devices for feeding stamps and applying paste thereto, of two paste-rollers located at such distance apart that they will apply lines of paste to the opposite edges of a stamp when drawn in contact with their peripheries and means for reciprocating the feeding devices between the rollers to seize the stamp and draw it over them.

23. The combination, substantially as set forth, in a mechanism for starting and feeding package-stamps, or similar sheets, of a mold-wheel, devices for starting the stamps and applying paste thereto located on one side of the wheel, tongs located on the opposite side of the wheel and constructed and operating to move across the path of the wheel to seize a stamp and draw it over a mold on the wheel.

24. The combination, substantially as set forth, with tongs constructed and operating to seize and draw a stamp or other sheet, of a discharger, devices for moving the tongs and discharger forward conjointly, devices for opening the tongs and stopping the discharger at a given point in its backward movement and before the tongs stop, whereby the tongs move past the discharger to disengage the stamp from the tongs.

25. The combination, substantially as set forth, with tongs 133 constructed and operating to seize and draw a stamp or other sheet, of a combined discharger and gage 147 whose normal position is slightly back of the forward end of the tongs, devices for moving the tongs and discharger forward and backward conjointly, devices for opening the tongs and stopping the discharger at a given point in its backward movement before the tongs stop, and devices for moving the tongs independently of the discharger to restore the latter to its normal position, whereby a stamp is discharged from the tongs at a given point and the extent of the entrance of the next stamp of the series into the jaws of the tongs is determined.

26. The combination substantially as set forth, with tongs constructed and arranged to seize and draw stamps or other sheets and provided with slotted jaws, of a discharger positioned in the slots of the jaws of the tongs, devices for elastically securing the discharger to the tongs, devices for moving the tongs and the discharger forward and backward conjointly, devices for stopping the backward movement of the discharger before that of the tongs is stopped and devices for opening and closing the tongs, for the purpose set forth.

27. The combination, substantially as set forth, in a mechanism for applying stamps or similar sheets to packages, with a wheel carrying molds in which the packages to which the stamps are applied are placed and a device for starting and feeding the stamps from a pile, of devices carried by the mold-wheel, means for changing the position of such devices accordingly as packages are present or absent from the molds, and devices attached to the stamp starting and feeding device and coacting with the devices having changing positions on the mold-wheel, whereby when no package is present in the mold to receive the next stamp of the pile the starting and feeding devices will be held out of feeding contact with such stamp and when a package is thus present the starting and feeding devices will be brought into feeding contact with such stamp.

28. The combination substantially as set forth, with a wheel carrying molds with movable bottoms, rods attached to the movable bottoms of the molds, a stamp starting and feeding device, a vertically-movable lever to which such device is attached and means for operating the lever, of a bell-crank lever arranged to coact at one of its ends with the rods attached to the movable mold-bottoms and at its other end with the vertically-movable lever, and means for limiting the movement of the bell-crank lever toward the mold-wheel.

29. The combination substantially as set forth, in a mechanism for applying stamps or similar sheets to packages, with an open end and open top package-mold, of a presser-folder composed of a presser-plate 174 and a plate or piece 171 carrying upon its ends folders 172, devices for yieldingly and elastically securing the plates together, means for moving the presser-plate into contact with a stamp placed upon a package in the mold and for forcing the plates toward each other while the presser-plate rests on top of the package, whereby the stamp on the package is subjected to the desired pressure and the folders are moved over the ends of the presser-plate to fold the ends of the stamp upon the package.

30. The combination, substantially as set forth, in a mechanism for applying stamps or similar sheets to packages, of a wheel provided with molds in which the packages are placed, a presser-folder constructed and operating to press and hold a stamp down upon the package and having means to fold its overhanging ends upon the ends of the package, devices for operating the presser-folder, laterally-swinging folding and holding wings, and devices for operating the same, for the purpose set forth.

31. The combination, substantially as set forth, of a wheel carrying a series of molds having lateral or end openings, a series of laterally-moving folding-wings constructed and arranged to enter such openings, devices for moving the wings away from the molds and devices for returning them to the molds to assist in folding the ends of a stamp upon a package and to hold them in position to seal the pasted ends in place.

32. The combination, substantially as set forth, with a wheel carrying a series of package-molds, of folders for folding the ends of stamps upon the ends of packages in the molds, a series of laterally-moving wings whose ends are provided with recesses to receive the folders, and devices for operating the folders and wings, for the purposes set forth.

33. The combination, in a mechanism for applying stamps or similar sheets to packages, with a mold provided with a movable bottom, and laterally-movable end-folding wings, of end flanges on the movable bottom and devices for moving the bottom toward the mouth of the mold to expel a contained package, said flanges operating to force and hold the wings out of contact with the ends of the packages.

WILLIAM R. LANDFEAR.
JAMES A. KEYES.

Witnesses:
W. V. BREMER,
E. L. BRACY.